United States Patent
McAliece et al.

(10) Patent No.: US 6,435,153 B1
(45) Date of Patent: Aug. 20, 2002

(54) ENGINE CONVERSIONS

(76) Inventors: Russell John McAliece; John Robert Bennett, both of 23 Webb Road, Airport West, Victoria 3042 (AU)

( * ) Notice: Subject to any disclaimer, the term of this patent is extended or adjusted under 35 U.S.C. 154(b) by 0 days.

(21) Appl. No.: 09/787,066
(22) PCT Filed: Sep. 13, 1999
(86) PCT No.: PCT/AU99/00755
§ 371 (c)(1), (2), (4) Date: May 14, 2001
(87) PCT Pub. No.: WO00/15953
PCT Pub. Date: Mar. 23, 2000

(30) Foreign Application Priority Data

Sep. 11, 1998 (AU) .............................................. PP 5810

(51) Int. Cl.$^7$ .......................... F02B 69/00; F02B 23/08; F01B 29/04
(52) U.S. Cl. ................................. 123/193.3; 123/193.5
(58) Field of Search ........................... 123/193.1, 193.3, 123/193.5, 657

(56) References Cited

U.S. PATENT DOCUMENTS 4,524,732 A * 6/1985 Dworak et al. .......... 123/193.5
5,033,427 A * 7/1991 Kawamura et al. ...... 123/193.5
6,354,260 B1 * 3/2002 Newsom et al. ......... 123/193.5

FOREIGN PATENT DOCUMENTS

NZ         299267      4/1998
WO    WO 97/18384 A1    5/1997

* cited by examiner

Primary Examiner—Marguerite McMahon
(74) Attorney, Agent, or Firm—Edwin D. Schindler

(57) ABSTRACT

An engine modification particularly suitable for permitting an engine, which initially ran on diesel fuel (diesel cycle) to run on gasoline (Otto cycle), includes a spacer plate connected between a cylinder head and the engine block for lowering the compression ratio of the engine. The inlet gas flow is modified so that the combustion charge introduced into the cylinder through at least one inlet valve is caused to move around the combustion chamber so that, during the period of the spark, much of the charge passes close to the spark plug to thereby obtain efficient burning of the combustion charge. A spacer plate for causing the required movement of the gas being introduced is also disclosed.

16 Claims, 3 Drawing Sheets

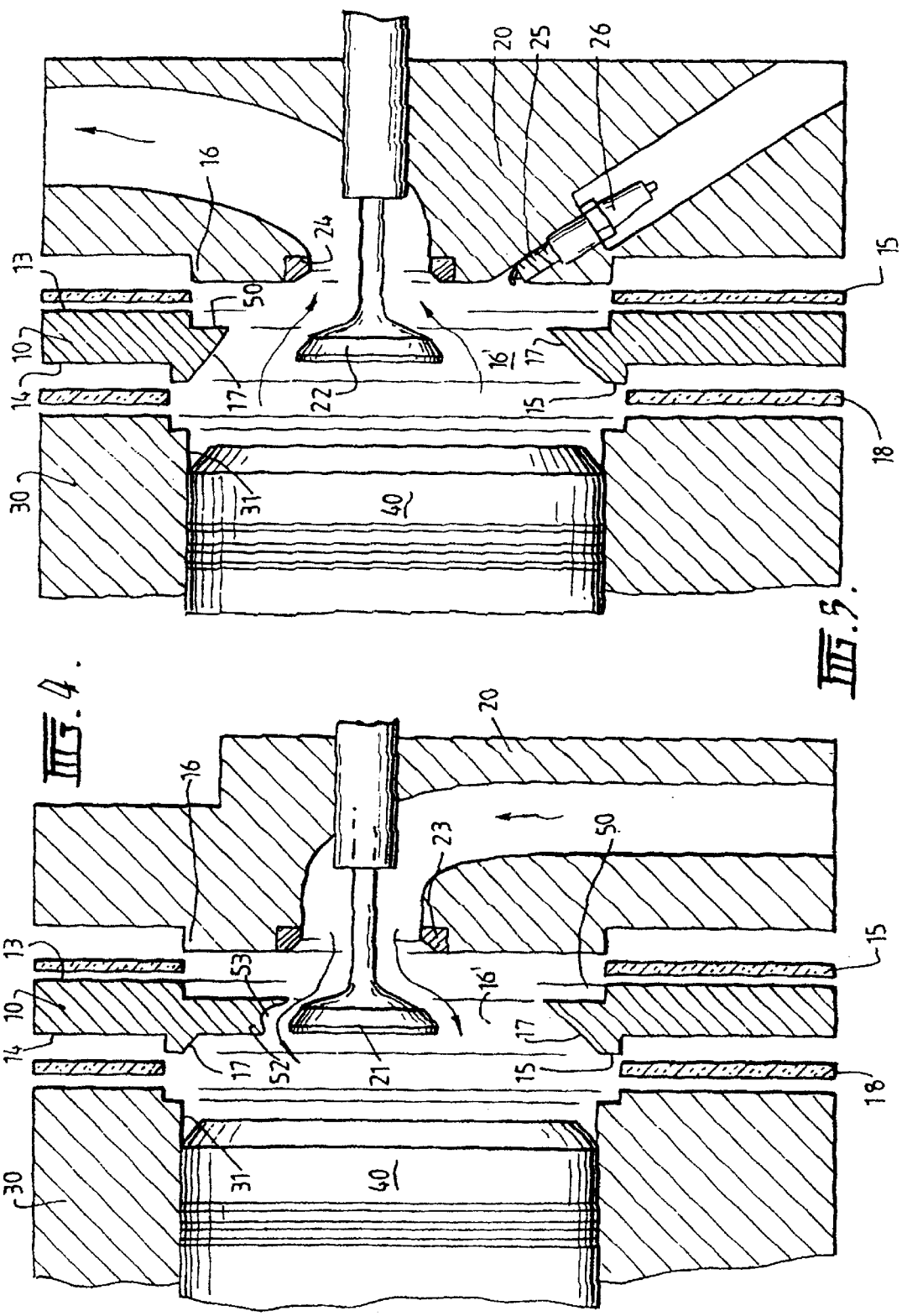

ENGINE CONVERSIONS

BACKGROUND OF THE INVENTION

1. Technical Field of the Invention

This invention relates to engine design and conversions and in particular relates to the conversion of diesel engines to Otto cycle operation. We will describe the use of gas as a fuel, but the same concept can be used for other alternative fuels, such as alcohol, or even petrol.

2. Description of the Prior Art

For many years it was believed that diesel engines were effectively non-polluting as far as particulates, smoke and oxides of nitrogen emissions were concerned, but it has been found that as the engines become more fuel efficient they also become more polluting and this has led to concern, particularly in cities where large numbers of diesel engined vehicles operate.

In the cities, the major users of diesel fuel are buses and thus a major part of pollution by diesel exhausts is caused by buses. There are, of course, also major fleets of buses in inter city operation, and substantial numbers of diesel powered transport vehicles in operation both in cities and inter city operation and substantial numbers of diesel powered vehicles in such operation.

The situation as far as pollution is concerned can be exacerbated if the city has an inversion layer, such as is the case in Melbourne, where there can be a substantial build up of photochemical smog if there are periods of low wind, particularly periods where there are low winds with no or only a small northerly component. It is obviously not feasible, in the short to medium term, to replace existing diesel buses or even their engines to minimize the problem of pollution. Similarly, it is not feasible to replace prime movers or their engines.

SUMMARY OF THE INVENTION

The object of the present invention is to provide a means whereby diesel engines can be converted to operate on gaseous fuels without losing any degree of power or substantially increasingly operating costs of the engine.

The invention in its broadest sense comprises an internal combustion Otto cycle engine having located between the engine block and the cylinder head a spacer plate which is so formed that as the combustion charge is passed into the engine and compressed, it is caused to move in such a way that a substantial part of the charge moves over the spark plug during an ignition event.

In a preferred form of the invention, the engine is an engine originally designed to operate on a diesel cycle modified to use a gaseous fuel The plate may be formed so that there is an extension over at least part of the inlet valve so that as the combustion charge enters the combustion chamber its direction of flow is diverted so effectively the whole of the charge is directed to the cylinder or cylinder head wall at an angle so that it spirals down the cylinder.

In a particular form of the invention where there are two inlet valves, one of the valves may be largely occluded by a member passing over the top thereof which increases the swirling of the charge.

The spark plug may preferably be located in what is the injector hole of the cylinder when the engine is being used with diesel fuel.

It is also preferred that an annular internal extension on the spacer plate and the upper end of the piston is relieved with an annular frusto-conical end which is adapted when the piston at its upper extremity of the stroke to terminate closely against the extension.

In another aspect of the invention, we provide a spacer plate to be connected between the engine block and the cylinder head of a diesel engine which spacer plate acts to reduce the compression ratio in the engine and which is internally formed so that as the charge air passes into the cylinder from the inlet valve or valves it is cause to move around the periphery of the cylinder and, because of frictional forces as well as the energy contained in the combustion charge, the whole body of gas tends to swirl.

The invention also includes a gas fuel engine having such a spacer plate between the engine block and the cylinder head.

In order that the invention may be more readily understood we shall describe with reference to the accompanying drawings, one particular embodiment of the invention.

BRIEF DESCRIPTION OF THE DRAWING FIGURES

In these drawings:

FIG. 4 is a section along line 4—4 of FIG. 2, somewhat exploded showing the arrangement of an inlet valve;

FIG. 5 is a section along line 5—5 of FIG. 2, similar to that of FIG. 4 showing the exhaust valve arrangement.

DETAILED DESCRIPTION OF THE DRAWING FIGURES AND PREFERRED EMBODIMENTS

Figure 1:
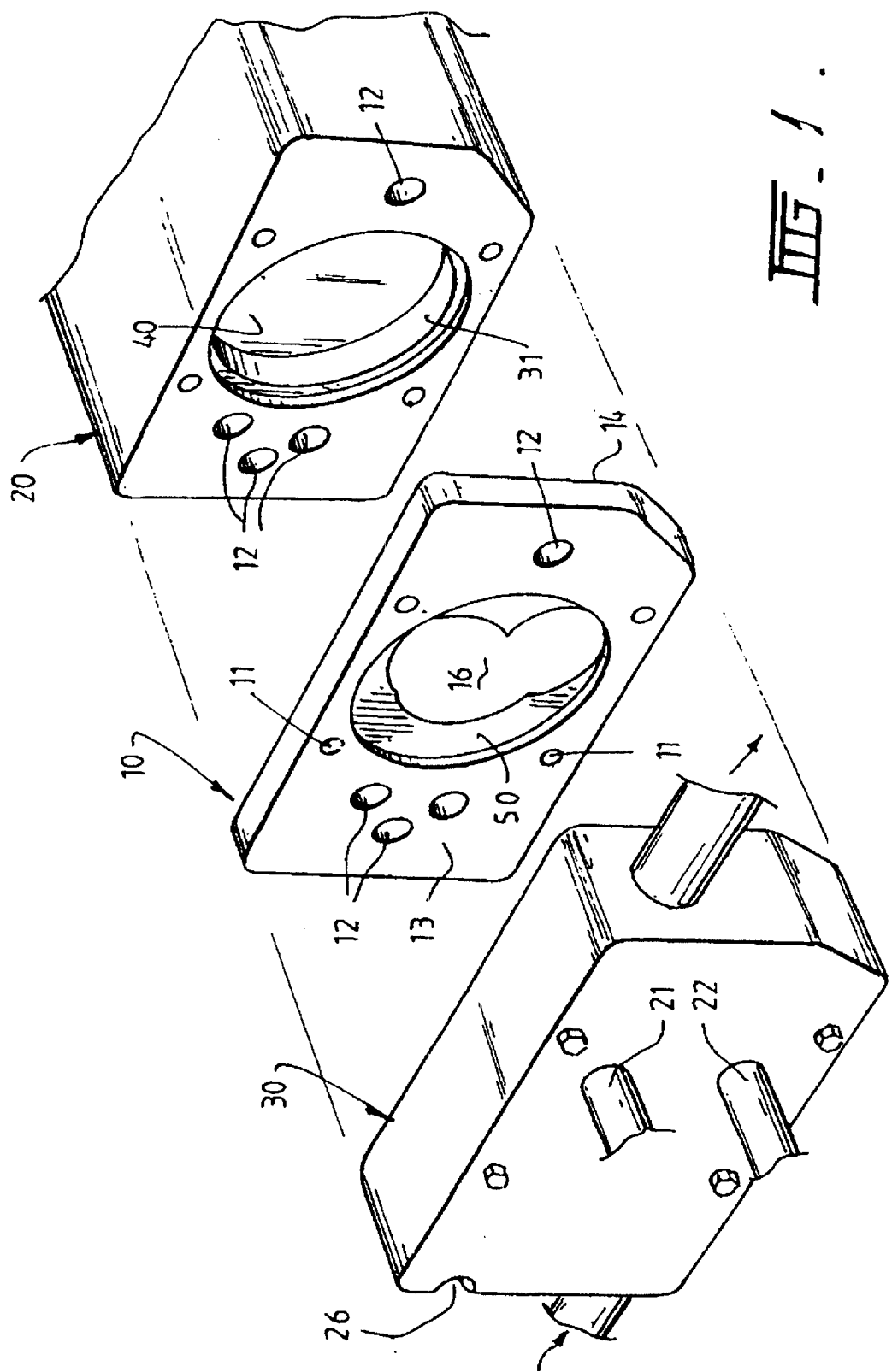
FIG. 1 shows an exploded view of the cylinder head, the spacer plate and the engine block of one cylinder of an engine.
Figure 2:
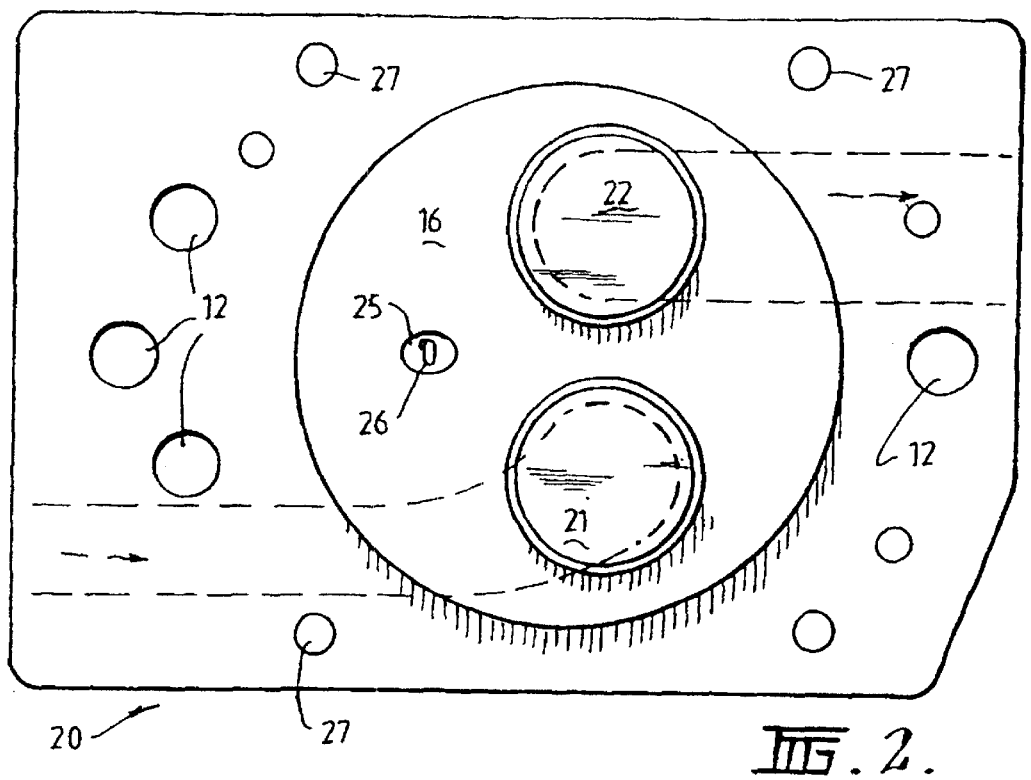
FIG. 2 is an underneath view of the cylinder head.
Figure 3:
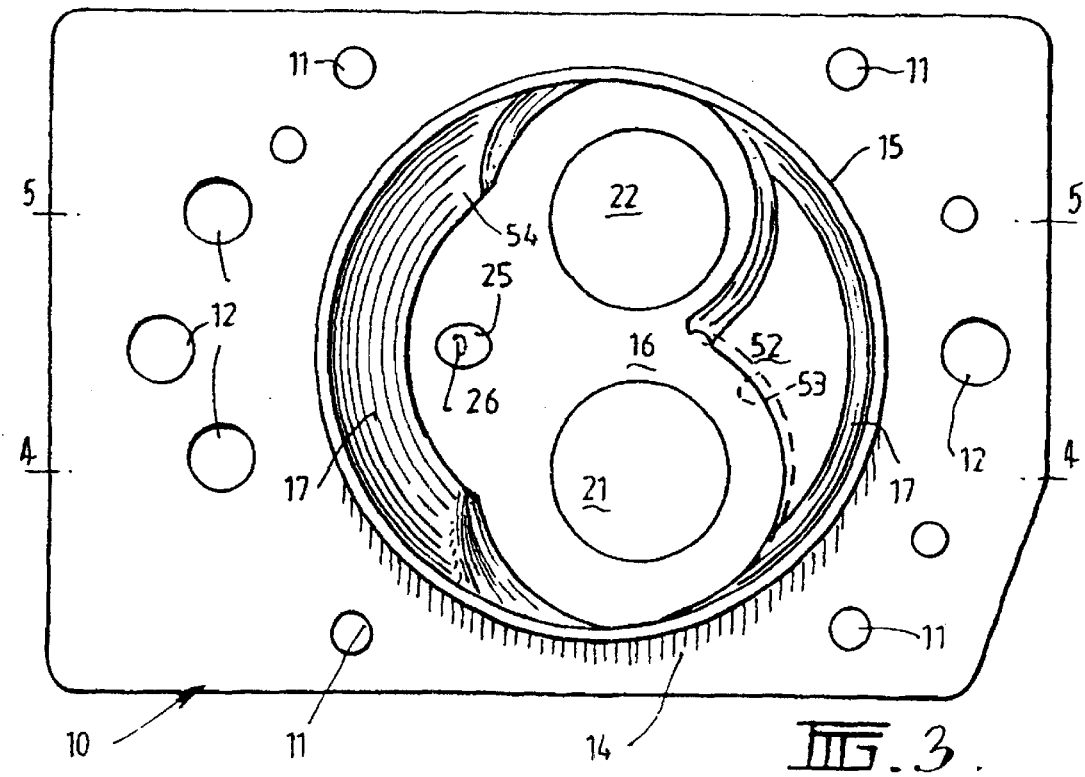
FIG. 3 is an underneath view of the spacer plate when located beneath the cylinder head of FIG. 2.

The embodiment will be described in relation to a flat six engine which has its pistons 40 running substantially horizontally and which has a separate cylinder head 20 for each cylinder 31 but it is to be understood that such requirements are not necessary for the invention.

Diesel engines of the type to which the invention relates can normally have a compression ratio of between 14 and 21.

One indicative example of an engine which is suited to conversion is a direct cylinder injected MAN engine which has a 12 litre capacity and in diesel form has a compression ratio of the order of approximately 19:1 .

These engines can be naturally aspirated or can be super or turbo charged and, as far as the description is concerned, it will relate to a naturally aspirated engine.

For the engine to run with gas as a fuel it is essential that its compression ratio be substantially reduced to, say, approximately half that as used in diesel operation. It is of course, not unknown in the engine technology industry to provide pressure reduction in a cylinder either by the location of a thick gasket, shims, or a metal plate to enlarge the volume as the piston rises to the top of the cylinder.

In this case we use a metal spacer plate 10 which, in this particular example, is made to be associated with the head 20 for one cylinder as each cylinder has a separate head. This plate 10 is adapted to co-operate with the cylinder head 20 which, in one form, has inlet and outlet valves 21,22 and their seats 23,24 and an injector aperture 25 which is modified to receive a spark plug 26.

As the charge to be passed into the cylinder, when the engine is being used in its diesel mode, the injector is located to provide dispersion of the diesel fuel charge. We have found that the position in the particular engine of the injector is satisfactory for the spark plug 26.

This does not mean that in each case we would necessarily use this aperture for a spark plug, it could well be plugged and an alternative spark plug aperture be located through the head in a position where it does not have any adverse effect on the waterways therein or it s could be located in the spacer plate 10.

For the purposes of the exercise we also show a head which uses a single inlet 21 and a single exhaust 22 valve although in some engines it may be more likely that there be two inlet valves to assist in the rapid introduction of air, in diesel mode, or combustion charge in gas mode, into the cylinder.

The plate 10 is preferably made of iron or steel although in some applications could be made of aluminium and is provided with stud holes 11 which are aligned with those 27 of the head and may also have waterways 12 passing therethrough to permit the passage of water from the engine block 3.0 to the head. These waterways 12 are in alignment with the waterways 32 in the block and the existing waterways in the head If required further coolant transfer passages could be provided.

The surface 13 of the plate 10, which is outwardly directed when it is positioned, that is the surface against which the head 20 rests, is machined smooth and may have an inwardly relieved counter bore to co-operate with a downward extension 16 on the head which, in diesel operation, provides a protector for the head gasket and a first gasket 15 can be located between the plate and the head.

The other surface 14 of the plate, which is the inner side, has a downwardly directed annular skirt 15 which is largely to protect a second cylinder head gasket 18, which abuts there against outwardly directed pressure when the piston 40 moves upwardly in the cylinder.

The inner surface of the annular skirt 15 can be tapered at 17 so as to receive a correspondingly formed upper end 41 of the piston, as will be described later.

The centre portion of the plate is partially cutout 16 so the inlet valve flow is in contact with the interior of a recess 50 formed in the underside of the plate and, ultimately, to the cylinder.

The cutout portion 16 can be deemed to be substantially heart-shaped and what would be considered to be the top of the heart is an incursion into the position between the two valves and then follows around the outer periphery of the valves. The cutout portion then extends downwardly beside the valves and ultimately to a position below the valves opposite the inwardly directed portion.

That is to say that the two valves could be considered to be largely in the two upper lobes of the heart-shaped portion and at the opposite side the heart-shaped portion is spaced from the valves.

As can be seen from FIG. 5, the portion about the exhaust valve 51 can basically be arranged so there is as little obstruction as possible to the exhaust gases being purged from the cylinder during the exhaust stroke of the engine. it can be to a major extent, a continuation of the valve seat 24 to aid this flow.

The portion 52 about the inlet valve adjacent the top of the heart, can, in vertical cross section, and as seen from FIG. 4, be arcuate with the centre part of the arc 53 being substantially lying in the plane in which the head of the inlet valve 21 will lie when it is in its fully open position.

Thus adjacent this portion of the valve at the top of the heart there is a recess 52 which acts, when the combustion mixture passes from the valve into the portion of the plate there adjacent to control the movement of the mixture.

The arrangement is such that the combustion mixture from the side of the valve away from the top of the heart shaped portion moves into the combustion chamber at an angle to the surface thereof and moves outwardly and strikes the wall of the combustion chamber.

The combustion mixture from the other side of the valve impinges upon the arcuate portion 52 and is moved across the head of the valve and is thus reinforcing the movement of the other portion so there is a general flow towards the periphery of the combustion chamber, but at an angle thereto so that the total gas mixture tends to swirl, generally about the cylinder. The portion 54 of the recess opposite the valves is tapered so that the rotating combustion mixture tends to be forced to move spirally, down into the cylinder.

This movement can be assisted by the inlet into the valve which can be at such a direction as to minimise the degree of deflection necessary for the charge leaving the valve from the unrestricted side and to aid in the turning of the charge from the side where the annular recess is located.

The reason for this arrangement is to cause the gas charge, by its move, passes the spark plug during the ignition period of the plug to ensure the best possibly burning of the charge.

If a three-valve engine is being used one of the inlet valves could be almost completely occluded by a member passing over the top of this to provide even more force to effect the spiral or spinning motion.

In the two-valve construction it is preferred that the overlying part 17 extends around approximately half of the circumference of the valve so that the movement of the charge is towards the wall contains as much of the charge as possible and as the piston 40 moves upwardly to the firing point, which can be close to top dead centre, or even advanced therefrom, the swirling movement of the charge is maintained as far as possible.

There are several aspects of the arrangement which enables good operation of the modified engine. Not the least of these is the formation in the plate 10 of the surround about the inlet valve 21.

In operation we have found that the engine can work perfectly well with LPG gas, propane, which is normally the fuel of choice for forklifts and the like, and even butane which generally is not deemed to be satisfactory for engine use because it is of an octane value less than normally required and it tends to pre-ignite.

Using the engine of the invention at the compression ratio which we deem to be the most satisfactory this problem is very largely eliminated.

On the compression stroke as mentioned above the charge is swirling in a spiral and on the operation of the spark we have found mathematically that the spiral rotates approximately three times during the period of ignition of the spark, that is, that a substantial part of the total charge passes in close proximity to the spark plug during its operation and this means that the burning is spread through the whole mass of the charge very much more quickly than would be expected to be the case where the charge is basically stationery or only locally turbulent. There is a secondary movement of the charge which will be described later.

This means that we get close to a full burn of the fuel, provided it was introduced at stoichometric or excess air quantities and the piston moves down the cylinder in the power stroke.

Also because of the efficiency of burning gained by the swirling mass of combustion charge, it is not necessary to fire well before top dead centre to ensure that there is total burning as the piston reaches top dead centre and the power stroke commences. By firing at or close to, even after top dead centre, we still get complete ignition and an effective power stroke. The later the firing of the charge, the less likely that knocking will occur as this is caused because power is being applied before the piston has reached the top of the stroke.

Once the power stroke has been completed, on the exhaust stroke there is relatively effectively scavenging of the exhaust gases, the exhaust valve 22 not being occluded in any way.

On induction, and the inlet valve 21 or valves can be opened as required, the charge is again induced and because of the shape of the heart-shaped cutout and the positioning of the recess or the portion overlying the valve, the new charge will be induced to spin or swirl so that when compression occurs there is again complete ignition.

The tapered portion 17 which passes into the cylinder 31 serves a purpose beyond protecting the head gasket 18, as mentioned earlier, although it certainly does do that, but also can aid in the combustion of the charge.

As the piston reaches close to top dead centre so the Last of the charge being moved upwardly by the piston tends to be diverted by the annular taper 17 and this causes the charge to be rotated more or less toroidally so that it tends to move upwardly and inwardly towards the top of the chamber. It must be recalled that this charge is also swirling about the chamber so that what is achieved is a complex movement which acts to bring a very substantial part of the charge into contact with the spark while it is firing and thus there is very good combustion of the charge.

We have found that with the engine using the invention the burning can readily be controlled to ensure complete combustion.

Examination of the spark plugs and also exhaust analysis has shown that there is effectively no unburnt carbon being deposited on the spark plugs or being emitted through the exhaust system.

We have found that to meet the stringent emission requirements of EURO 2 it is not necessary to use a catalytic convertor with the engine of the invention. Also, exhaust gas analysis has shown negligible nitrous oxides.

Whilst we have described herein one particular form of plate and chamber it is to be understood that the form of these can vary not only to suit different engines but also to suit different valve arrangements so that regardless of the position or angle of the inlet valve the combustion gas mixture is caused to swirl as discussed.

Further, whilst we have described in the embodiment the use of gas as the fuel, the engine could also be operated on alcohol or even petrol, the method of causing the movement of the combustion charge in the cylinder being that which is inventive.

We claim:

1. An internal combustion Otto cycle engine, comprising: a spacer plate located between an engine block and a cylinder head, said spacer plate being formed.

2. The internal combustion Otto cycle engine according to claim 1, wherein said engine operates on a diesel cycle and is modified for use as an Otto fuel cycle.

3. The internal combustion Otto cycle engine according to claim 1, wherein said engine is constructed to operate on gasoline.

4. The internal combustion Otto cycle engine according to claim 1, wherein said engine is constructed to operate on an alcohol.

5. The internal combustion Otto cycle engine according to claim 1, wherein the spark plug is located in said cylinder head.

6. The internal combustion Otto cycle engine according to claim 1, wherein the spark, plug is located in said spacer plate.

7. The internal combustion Otto cycle engine according to claim 1, wherein said spacer plate is formed so that there is an extension over, at least, one inlet valve in said cylinder head, so that as the combustion charge enters a combustion chamber, the direction of flow of the combustion charge is diverted so that substantially the entire combustion charge is directed to a cylinder or a cylinder head wall at an angle so that the combustion charge moves in a spiral around the cylinder.

8. The internal combustion Otto cycle engine according to claim 7, wherein the direction of flow of the combustion charge has a downward component so that the combustion charge tends to spiral down the cylinder.

9. The internal combustion Otto cycle engine according to claim 7, wherein a portion of said spacer plate away from the inlet valve has a tapered surface which, when struck by a moving combustion mixture, tends to move this combustion mixture into the cylinder.

10. The internal combustion Otto cycle engine according to claim 7, wherein there are two of said inlet valves, with one of said two inlet valves being substantially occluded by a member passing over a top end thereof, to thereby increase the spiraling of the combustion charge.

11. The internal combustion Otto cycle engine according to claim 1, wherein the spark plug is located in an injection hole of the cylinder when said engine is using diesel fuel and said spacer plate is formed so that there is an extension over at least one inlet valve in said cylinder head, so that as the combustion charge enters a combustion chamber, the direction of flow of the combustion charge is diverted so that substantially the entire combustion charge is directed to a cylinder or a cylinder head wall at an angle so that the combustion charge moves in a spiral around the cylinder.

12. The internal combustion Otto cycle engine according to claim 1, further comprising an annular internal extension on an inwardly directed surface of said spacer plate and an upper end of a piston of said engine is relieved with an annular frusto-conical end which is adapted, when the piston is at its upper extremity of a stroke, to terminate closely against said annular internal extension.

13. A spacer plate for use in an internal combustion engine connected between an engine block and a cylinder head of said engine constructed to operate on, diesel fuel, said spacer plate acting to reduce the compression ratio in said engine and being internally constructed so that a combustion charge passes into a cylinder of said engine from at least one inlet valve, the combustion charge thereby being caused to move around a periphery of the cylinder.

14. The spacer plate for use in an internal combustion engine according to claim 13, wherein said spacer plate is formed so that there is an extension over at least one inlet valve in said cylinder head, so that as the combustion charge enters a combustion chamber, the direction of flow of the combustion charge is diverted so that substantially the entire combustion charge is directed to a cylinder or a cylinder head wall at an angle so that the combustion charge moves in a spiral around the cylinder.

15. A gas-fuelled engine, comprising a spacer plate connected between an engine block and a cylinder head of said engine, said spacer plate acting to reduce the compression ratio in said engine and being internally constructed so that a combustion charge passes into a cylinder of said engine from at least one inlet valve, the combustion charge thereby being caused to move around a periphery of the cylinder.

16. The gas-fuelled engine according to claim 15, wherein said spacer plate is formed so that there is an extension overt at least one inlet valve in said cylinder head, so that as the combustion charge enters a combustion chamber, the direction of flow of the combustion charge is diverted so that substantially the entire combustion charge is directed to a cylinder or a cylinder head wall at an angle so that the combustion charge moves in a spiral around the cylinder.

* * * * *